UNITED STATES PATENT OFFICE.

GEO. E. VAN DERBURGH, OF MAMARONECK, N. Y., ASSIGNOR, THROUGH MESNE ASSIGNMENTS, TO NEW YORK QUARTZ COMPANY, OF NEW YORK.

IMPROVEMENT IN THE MANUFACTURE OF ARTIFICIAL STONE.

Specification forming part of Letters Patent No. 28,540, dated May 29, 1860; Reissue No. 1,297, dated April 1, 1862; Reissue No. 1,676, dated May 17, 1864.

DIVISION C.

*To all whom it may concern:*

Be it known that I, GEORGE E. VAN DERBURGH, of Mamaroneck, in the county of Westchester and State of New York, have invented a new and useful Improvement in the Manufacture of Artificial Stone; and I do hereby declare that the following is a full, clear, and exact description thereof.

One of the best artificial stones known to me for building purposes is what is known as the "Foster Block," which is produced by the process set forth in and secured by the patent granted to Ambrose Foster, January 16, 1855. These blocks, which are composed of sand and lime united by a high degree of pressure, require at least six months' exposure to the atmosphere to give to the component parts thereof the requisite degree of adhesion and hardness to resist the action of the elements; but by saturating the said blocks with a liquid silicate soon after they are formed, they will attain a sufficient degree of hardness to enable them to successfully withstand the action of the elements, even if built into a wall and exposed to the weather within two weeks after leaving the molds. The same beneficial effect will also be produced by a similar use of a liquid silicate in the manufacture or perfection of other artificial stones or blocks which are principally composed of lime and sand.

Any suitable apparatus may be employed for effecting the thorough saturation of the blocks or stones with the liquid silicate.

What I claim as my invention, and desire to secure by Letters Patent, is—

The improvement produced upon artificial stones, blocks, &c., which are principally composed of lime and sand, by saturating the same with a liquid silicate after the said articles are put into the proper shape for use by any known or suitable process.

The foregoing specification signed this 13th day of April, 1864.

GEORGE E. VAN DERBURGH.

Witnesses:

GEO. A. MAYHEW,

JOHN GREACEN, Jr.